United States Patent
An et al.

(10) Patent No.: US 11,607,648 B2
(45) Date of Patent: Mar. 21, 2023

(54) ASSEMBLY-TYPE CARTRIDGE BLOCK AND HOLLOW-FIBER MEMBRANE MODULE COMPRISING SAME

(71) Applicant: KOLON INDUSTRIES, INC., Seoul (KR)

(72) Inventors: Na-Hyeon An, Seoul (KR); Kyoung-Ju Kim, Seoul (KR); Jin-Hyung Lee, Seoul (KR); Woong-Jeon Ahn, Seoul (KR); In-Ho Kim, Seoul (KR)

( * ) Notice: Subject to any disclaimer, the term of this patent is extended or adjusted under 35 U.S.C. 154(b) by 470 days.

(21) Appl. No.: 16/649,878

(22) PCT Filed: Sep. 19, 2018

(86) PCT No.: PCT/KR2018/011073
§ 371 (c)(1),
(2) Date: Mar. 23, 2020

(87) PCT Pub. No.: WO2019/066371
PCT Pub. Date: Apr. 4, 2019

(65) Prior Publication Data
US 2020/0330927 A1   Oct. 22, 2020

(30) Foreign Application Priority Data
Sep. 26, 2017   (KR) .......... 10-2017-0124279

(51) Int. Cl.
*B01D 63/04* (2006.01)
*B01D 69/08* (2006.01)
*H01M 8/04119* (2016.01)

(52) U.S. Cl.
CPC ............ *B01D 63/04* (2013.01); *B01D 69/08* (2013.01); *H01M 8/04149* (2013.01); *B01D 2313/06* (2013.01); *B01D 2313/44* (2013.01)

(58) Field of Classification Search
CPC .... B01D 63/04; B01D 69/08; B01D 2313/06; B01D 2313/44; B01D 2313/02;
(Continued)

(56) References Cited

U.S. PATENT DOCUMENTS

2006/0243653 A1   11/2006   Heinrich et al.
2012/0074056 A1*   3/2012   Lee .................. B01D 65/00
                                                29/428
(Continued)

FOREIGN PATENT DOCUMENTS

CN   106102881 A   11/2016
CN   107004872 A    8/2017
(Continued)

OTHER PUBLICATIONS

English language machine translation of KR1020140038223, 10 pages, No Date.*
(Continued)

*Primary Examiner* — Pranav N Patel
(74) *Attorney, Agent, or Firm* — Harvest IP Law, LLP

(57) ABSTRACT

The present invention relates to an assembly-type cartridge block enabling various types of cartridges, and a hollow-fiber membrane module comprising the same. The assembly-type cartridge block of an embodiment of the present invention comprises: a body part having a plurality of hollow-fiber membranes therein and having mesh parts formed respectively at the upper and lower parts thereof; and a fastening part formed on a side surface of the body part and configured to be fastened to an adjacent assembly-type cartridge block. Further, the hollow-fiber membrane module of an embodiment of the present invention comprises: a housing unit including a first fluid inlet, a first fluid outlet, a second fluid inlet, and a second fluid outlet; and a cartridge unit installed inside the housing unit and formed by fasten- (Continued)

ing a plurality of assembly-type cartridge blocks, each of the assemble type cartridge blocks having a plurality of hollow-fiber membranes therein.

6 Claims, 6 Drawing Sheets

(58) Field of Classification Search
CPC ............ B01D 2313/21; B01D 2313/54; B01D 2319/04; B01D 63/02; H01M 8/04149; H01M 8/004; H01M 8/1058; H01M 2008/1095; Y02E 60/50; Y02P 70/50
See application file for complete search history.

(56) References Cited

U.S. PATENT DOCUMENTS

| | | | | |
|---|---|---|---|---|
| 2012/0270120 A1* | 10/2012 | Kim | ................. | H01M 8/04156 429/413 |
| 2013/0065140 A1* | 3/2013 | Kim | ...................... | B01D 63/04 429/413 |
| 2019/0015787 A1* | 1/2019 | Oh | ......................... | H01M 8/04 |

FOREIGN PATENT DOCUMENTS

| | | | |
|---|---|---|---|
| DE | 102014225273 A1 | | 2/2016 |
| EP | 2514016 A2 | | 10/2012 |
| JP | S62190607 U | | 12/1987 |
| JP | 07-124445 A | | 5/1995 |
| JP | 2006198495 A | | 8/2006 |
| JP | 2013519976 A | | 5/2013 |
| KR | 201000108092 | * | 10/2010 |
| KR | 20130034404 A1 | | 4/2013 |
| KR | 1020140038223 | * | 3/2014 |
| KR | 10-2015-0120142 A | | 10/2015 |
| KR | 20160038227 A | | 4/2016 |
| KR | 10-2016-0076618 A | | 7/2016 |
| WO | 2012023788 A2 | | 2/2012 |
| WO | 2014171677 A1 | | 10/2014 |
| WO | 2016208878 A1 | | 12/2016 |

OTHER PUBLICATIONS

English language machine translation of KR201000108092, 6 pages, No Date.*
CN office action dated Aug. 2, 2021.
International Search Report for PCT/KR2018/011073 dated Dec. 20, 2018 [PCT/ISA/210].
Written Opinion for PCT/KR2018/011073 dated Dec. 20, 2018 [PCT/ISA/210].
EP Search Report dated May 6, 2021.
Office Action issued by JPO dated Feb. 25, 2021.

* cited by examiner

ASSEMBLY-TYPE CARTRIDGE BLOCK AND HOLLOW-FIBER MEMBRANE MODULE COMPRISING SAME

CROSS REFERENCE TO RELATED APPLICATIONS

This application is a National Stage of International Application No. PCT/KR2018/011073 filed Sep. 19, 2018, claiming priority based on Korean Patent Application No. 10-2017-0124279 filed Sep. 26, 2017.

TECHNICAL FIELD

The present disclosure relates to a hollow fiber membrane module, and more particularly to an assembly type cartridge block capable of enabling various forms of cartridges to be manufactured and a hollow fiber membrane module including the same.

BACKGROUND ART

A fuel cell is a power generation cell that combines hydrogen and oxygen to generate electricity. Such a fuel cell has advantages in that, unlike a general chemical cell such as a dry cell or a storage cell, it is possible to continuously generate electricity as long as hydrogen and oxygen are supplied and in that there is no heat loss so that efficiency of the fuel cell is as about twice high as efficiency of an internal combustion engine.

In addition, the fuel cell directly converts chemical energy generated by combination of hydrogen and oxygen into electrical energy, and thus only a small amount of contaminants, if any, are discharged. Consequently, the fuel cell has advantages in that it is environmentally friendly and a concern about depletion of resources due to an increase in energy consumption can be reduced.

Depending on the kind of an electrolyte that is used, such a fuel cell may be classified into a polymer electrolyte membrane fuel cell (PEMFC), a phosphoric acid fuel cell (PAFC), a molten carbonate fuel cell (MCFC), a solid oxide fuel cell (SOFC), an alkaline fuel cell (AFC), and so on.

These fuel cells are operated fundamentally by the same principle, but are different from each other in terms of the kind of fuel that is used, operating temperature, catalyst, and electrolyte. Among these fuel cells, the polymer electrolyte membrane fuel cell is known as being the most favorable to a transportation system as well as small-scale stationary power generation equipment, since the polymer electrolyte membrane fuel cell is operated at a lower temperature than the other fuel cells and the output density of the polymer electrolyte membrane fuel cell is high, whereby it is possible to miniaturize the polymer electrolyte membrane fuel cell.

One of the most important ways to improve the performance of the polymer electrolyte membrane fuel cell is to supply at least a certain amount of moisture to a polymer electrolyte membrane (also called 'proton exchange membrane') (PEM) of a membrane electrode assembly (MEA) in order to retain water content. The reason for this is that, if the polymer electrolyte membrane becomes dry, power generation efficiency is abruptly reduced.

Among the methods for humidifying a polymer electrolyte membrane are 1) a bubbler humidification method which fills a pressure-resistant container with water and allows a target gas to pass through it by means of a diffuser so that the target gas can be provided with moisture, 2) a direct injection method which calculates the amount of moisture required to be supplied for fuel cell reaction and supplies moisture directly to a gas flowing pipe through a solenoid valve, and 3) a membrane humidification method which supplies moisture to a gaseous fluid bed using a polymer separation membrane.

Among these methods, the membrane humidification method, which uses a membrane permeable only to water vapor among an off-gas and provides the water vapor to a gas supplied to the polymer electrolyte membrane in order to humidify the polymer electrolyte membrane, is advantageous in that it is possible to reduce the weight and size of a humidifier.

In the case in which a module is formed, a hollow fiber membrane having large permeable area per unit volume is preferably used as the permselective membrane for the membrane humidification method. That is, in the case in which a humidifier is manufactured using hollow fiber membranes, the hollow fiber membranes having large contact surface area can be highly integrated, whereby it is possible (i) to sufficiently humidify a fuel cell even in the case of a small capacity, (ii) to use a low-priced material, and (iii) to collect and reuse the moisture and heat included in a hot unreacted gas discharged from a fuel cell.

In the case of the humidifier using the hollow fiber membrane, a plurality of hollow fiber membranes are integrated in order to increase the capacity of the humidifier. In this case, however, gaseous fluid bed outside the hollow fiber membranes cannot be uniformly formed through the entirety of the interior of the humidifier due to the resistance caused by the highly integrated hollow fiber membranes.

In order to overcome this problem, as shown in FIG. 1, a hollow fiber membrane module having a plurality of cartridges 11 installed therein has been developed. Since the plurality of cartridges 11 are mounted in a humidifier housing 10, it is possible to achieve uniform flow of gas. That is, each of the cartridges 11 accommodates a bundle of hollow fiber membranes and the plurality of cartridges 11 are mounted in the humidifier housing 10 such that introduced gas flows through the interior of each of the cartridges, whereby it is possible to achieve uniform flow of the gas.

However, such a conventional cartridge type has the following problems.

Each of the cartridges 11 has the width similar to that of the humidifier housing 10. Accordingly, whenever the size of the humidifier housing 10 is changed, it is necessary to separately manufacture a cartridge having a size corresponding to the humidifier housing 10. In addition, the cartridge thus manufactured cannot be used in a humidifier housing 10 having a different size. Consequently, such a conventional cartridge is not suitable for mass production.

DISCLOSURE

Technical Problem

It is an object of the present disclosure to provide an assembly type cartridge block capable of enabling various forms of cartridges to be manufactured and a hollow fiber membrane module including the same.

Technical Solution

An assembly type cartridge block according to an embodiment of the present disclosure comprises:

a body part having a plurality of hollow fiber membranes therein, the body part having a mesh part configured to allow a fluid to be introduced into the body part therethrough; and a fastening part formed on the body part, the fastening part configured to be fastened to an adjacent assembly type cartridge block.

According to an aspect of the present disclosure, the body part may has shape of a polygonal prism.

According to an aspect of the present disclosure, the body part may have a shape of a fan-shaped prism with a fan-shaped base plane or a shape of a doughnut-shaped and fan-shaped prism formed by cutting an end part of a fan-shaped prisme in such a way that a base plane thereof has an arc shape in its entirety.

According to an aspect of the present disclosure, the body part may be provided at opposite ends thereof with potting parts configured to bind the hollow fiber membranes together and to fill gaps between the hollow fiber membranes.

A hollow fiber membrane module according to an embodiment of the present disclosure comprises:

a housing unit having a first fluid inlet, a first fluid outlet, a second fluid inlet, and a second fluid outlet; and a cartridge unit installed in the housing unit, the cartridge unit including a plurality of assembly type cartridge blocks fastened together, each of the plurality of assembly type cartridge blocks having a plurality of hollow fiber membranes therein.

According to an aspect of the present disclosure, each of the assembly type cartridge blocks may comprise: a body part having the plurality of hollow fiber membranes therein, the body part having a mesh part configured to allow a fluid to be introduced into the body part therethrough; and a fastening part formed on the body part, the fastening part configured to be fastened to an adjacent assembly type cartridge block.

According to an aspect of the present disclosure, the body part may has a shape of a polygonal prism.

According to an aspect of the present disclosure, the body part may have a shape of a fan-shaped prism with a fan-shaped base plane or a shape of a doughnut-shaped and fan-shaped prism formed by cutting an end part of a fan-shaped prism in such a way that a base plane thereof has an arc shape in its entirety.

According to an aspect of the present disclosure, the body part may be provided at opposite ends thereof with potting parts configured to bind the hollow fiber membranes together and to fill gaps between the hollow fiber membranes.

According to an aspect of the present disclosure, the cartridge unit may further comprise a dummy cartridge block which has flow membranes therein or is filled with fluid impermeable membranes, the flow membranes configured to allow a fluid to flow therethrough without moisture exchange.

According to an aspect of the present disclosure, the housing unit may comprise a housing cap having the first fluid inlet; and a fluid guide formed on the housing cap, the fluid guide configured to uniformly supply a first fluid introduced through the first fluid inlet to the cartridge unit.

The details of other embodiments according to various aspects of the present disclosure are included in the following detailed description of the present disclosure.

Advantageous Effects

According to embodiments of the present disclosure, it is possible to install a cartridge in a housing unit using standardized assembly type cartridge blocks irrespective of the size of the housing unit, whereby it is not necessary to separately manufacture a cartridge having a size corresponding to the size of the housing unit.

In addition, since it is possible to install the cartridge in the housing unit irrespective of the size of the housing unit, the cartridge for a hollow fiber membrane module is suitable for mass production.

In addition, the space inside the assembly type cartridge block is so small that the hollow fiber membranes can be densely packed therein and can hardly move relative to each other, and thus the risk of entanglement and damage of the hollow fiber membranes that otherwise might occur during the manufacturing or operating process can be reduced.

In addition, the hollow fiber membranes inserted into the assembly type cartridge block having a relatively small size are structurally supported by the assembly type cartridge block so that a risk of damage of the hollow fiber membranes is reduced.

MODE OF INVENTION

The present disclosure may be changed in various manners and may have various embodiments. Some specific embodiments will be illustrated and described in detail in the following detailed description. However, the present disclosure is not limited to the specific embodiments, and it should be understood that the present disclosure includes all modifications, equivalents, or substitutions included in the idea and technical scope of the present disclosure.

The terms used in the present disclosure are provided only to describe the specific embodiments, and do not limit the present disclosure. Singular forms are intended to include plural forms as well, unless the context clearly indicates otherwise. In the present disclosure, it should be understood that the terms "comprise," "have," etc. specify the presence of features, numbers, steps, operations, elements, components, or combinations thereof described in the specification, but do not preclude the presence or addition of one or more other features, numbers, steps, operations, elements, components, or combinations thereof. Hereinafter, an assembly type cartridge block according to an embodiment of the present disclosure and a hollow fiber membrane module including the same will be described with reference to the accompanying drawings.

Figure 1:
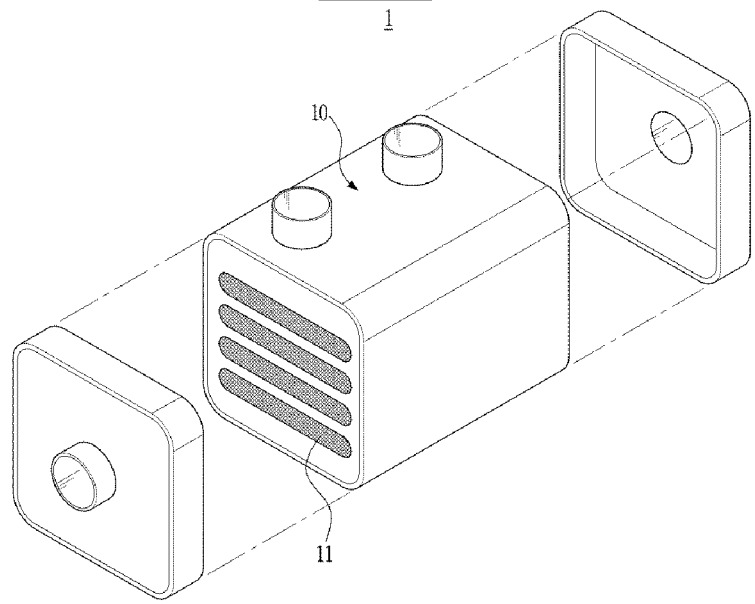
FIG. 1 shows a conventional hollow fiber membrane module.
Figure 2:
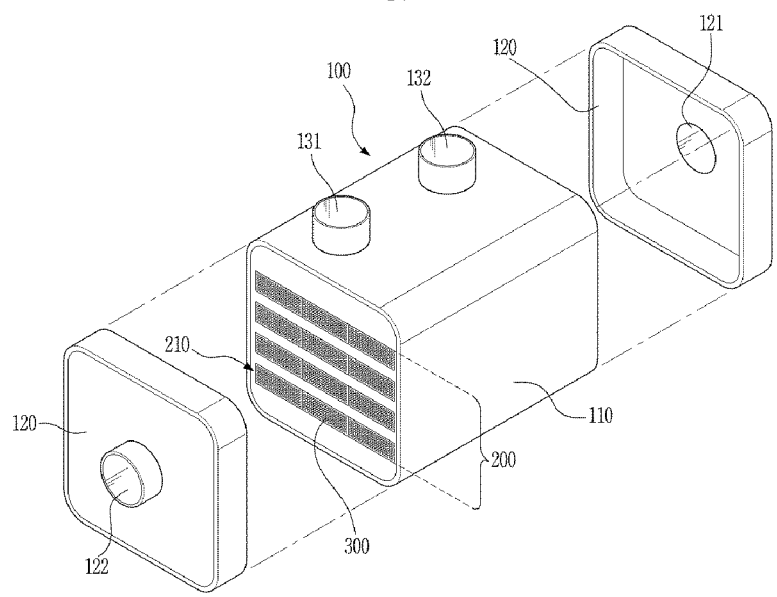
FIG. 2 shows a hollow fiber membrane module according to a first embodiment of the present disclosure.
Figure 3:
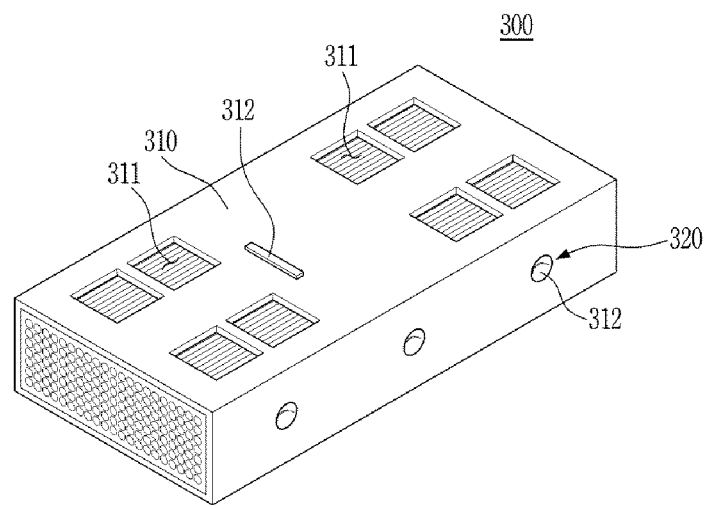
FIG. 3 shows an assembly type cartridge block to be installed in the hollow fiber membrane module according to the first embodiment of the present disclosure.

FIG. 2 shows a hollow fiber membrane module according to a first embodiment of the present disclosure, and FIG. 3 shows an assembly type cartridge block installed in the hollow fiber membrane module according to the first embodiment of the present disclosure.

As shown in FIG. 2, the hollow fiber membrane module according to the first embodiment of the present disclosure comprises a housing unit 100 and a cartridge unit 200.

The housing unit 100 defines the external appearance of the hollow fiber membrane module. The housing unit 100 may include a housing body 110 and housing caps 120, which may be coupled to each other in order to constitute an integrated housing unit. Each of the housing body 110 and the housing caps 120 may be made of hard plastic, such as polycarbonate, or metal.

The lateral sectional shape of each of the housing body 110 and the housing caps 120 may be a polygon or a circle. The polygon may be a triangle, a rectangle, a square, a trapezoid, a parallelogram, a pentagon, or a hexagon. Optionally, the polygon may have rounded corners. In addition, the circle should be understood as including an oval.

The housing body 110 is provided with a second fluid inlet 131 to receive a second fluid, and a second fluid outlet 132 to discharge the second fluid.

The housing caps 120 are coupled to the housing body 110. For example, the housing caps 120 may be coupled to opposite ends of the housing body 110. The housing caps 120 are provided with a first fluid inlet 121 and a first fluid outlet 122, respectively. A first fluid introduced through the first fluid inlet 121 of one of the housing caps 120 is introduced into the cartridge unit 200, passes through lumens of hollow fiber membranes, flows out of the cartridge unit 200, and is discharged outside through the first fluid outlet 122 of the other housing cap 120.

Inside the housing unit 100 is disposed a cartridge unit 200 including a plurality of assembly type cartridge blocks 300 fastened together each of which has a plurality of hollow fiber membranes therein. The hollow fiber membranes are selectively permeable to moisture. The material for each of the hollow fiber membranes is well known, and therefore a detailed description thereof will be omitted here.

In the present disclosure, a certain number of standardized assembly type cartridge blocks 300 are fastened to each other to form a single cartridge 210, and a plurality of cartridges 210 are disposed in the housing 100 to form a cartridge unit 200.

Hereinafter, an assembly type cartridge block 300, which is a basic unit element to form the cartridge unit 200, will be described with reference to FIG. 3. As shown in FIG. 3, the assembly type cartridge block 300 comprises a body part 310 and a fastening part 320.

A plurality of hollow fiber membranes are accommodated in the body part 310, and a mesh part 311 is formed at each of the upper and lower parts of the body part 310. The shape of a cartridge unit 200 formed by assembling a plurality of assembly type cartridge blocks 300 may be determined irrespective of the shape of the housing unit 100. Alternatively, the shape of the cartridge unit may be determined so as to correspond to the internal shape of the housing unit 100. For example, in the case in which the shape of the housing unit 100 is rectangular parallelepiped, as shown in FIG. 2, the shape of a cartridge unit 200 formed by assembling a plurality of assembly type cartridge blocks 300 may also be corresponding rectangular parallelepiped. In the case in which the sectional shape of the housing unit 100 is trapezoid, parallelogram, pentagon, or hexagon, the shape of the cartridge unit 200 may be a polygonal prism corresponding thereto.

Figure 4:
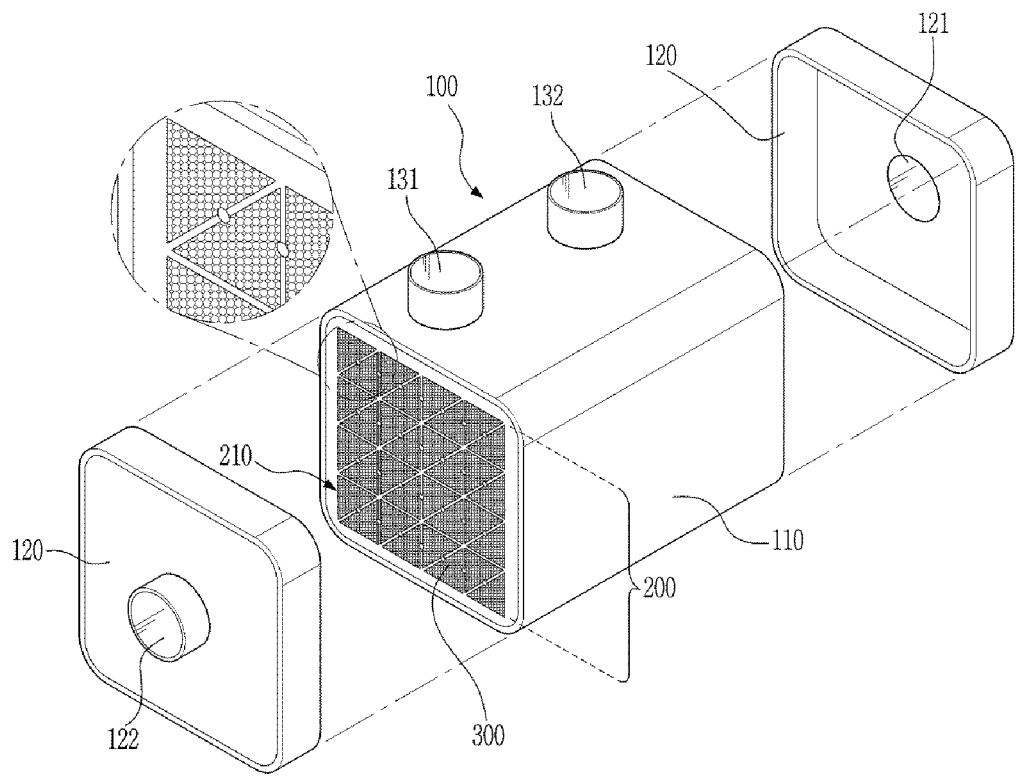
FIGS. 4 to 6 show various alternative forms of the hollow fiber membrane module according to the first embodiment of the present disclosure.

When the sectional shape of the cartridge unit 200 is a polygon, the body part 310 may be formed in the shape of a triangular prism. For example, in the case in which the cartridge unit 200 has a shape of a quadrangular prism, as shown in FIG. 4, a plurality of assembly type cartridge blocks having a shape of a triangular prism may be coupled to each other to realize a quadrangular prism shape corresponding to the shape of the cartridge unit 200.

Figure 5:
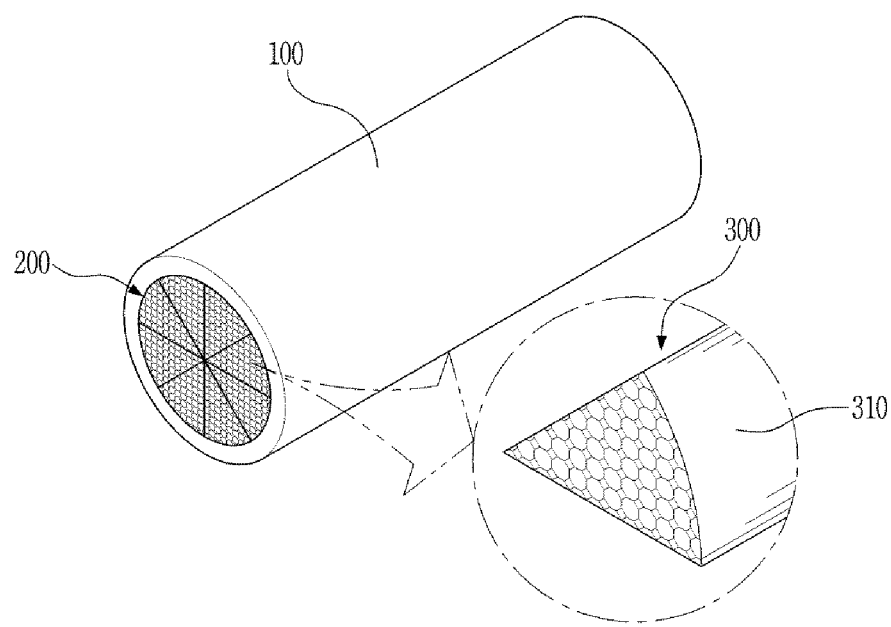

In addition, for example, in the case in which the cartridge unit 200 has a cylindrical shape, as shown in FIG. 5, the body part 310 is formed to have a shape of a fan-shaped prism having a fan-shaped base plane such that a cylindrical cartridge unit 200 can be obtained by coupling a plurality of such cartridge blocks to each other.

Figure 6:
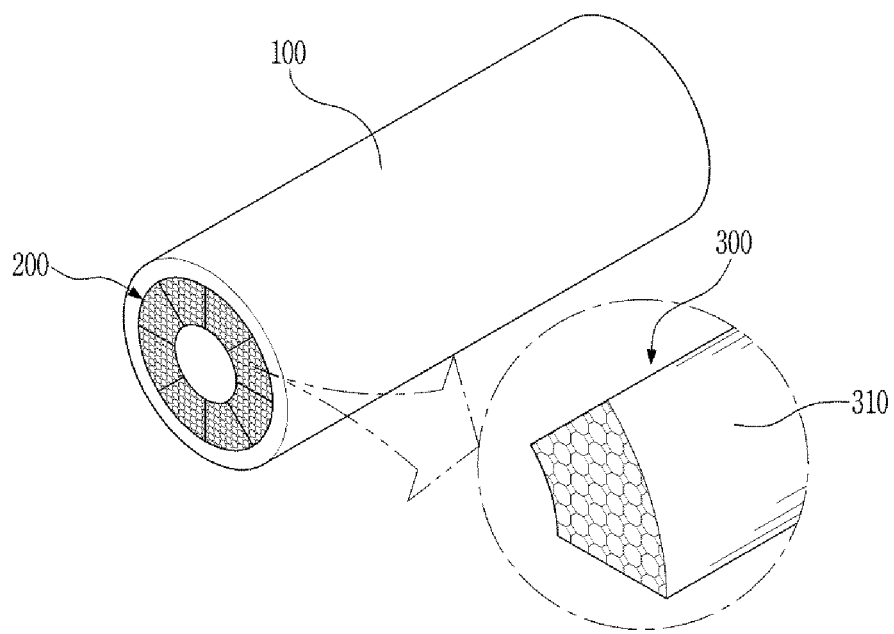

In addition, for example, in the case in which the shape of the housing unit 100 is a cylindrical shape and the shape of the cartridge unit 200 formed by coupling a plurality of assembly type cartridge blocks to each other is a hollow cylindrical shape having a doughnut-shaped section, as shown in FIG. 6, the body part 310 is formed to have a shape of a doughnut-shaped and fan-shaped prism formed by cutting an end part of a fan-shaped prism in such a way that a base plane thereof has an arc shape in its entirety.

The body part 310 may include a separation preventing hook 312 configured to prevent the cartridge 210 (see FIG. 2) or cartridge unit 200 (see FIGS. 5 and 6) inserted in the housing unit 100 from being separated therefrom, the cartridge 210 or cartridge unit 200 having a plurality of assembly type cartridge blocks 300 fastened to each other. The separation preventing hook 312 may be formed on at least one of all surfaces of the body part 310 to have a shape of a protrusion protruding by a predetermined length.

The mesh part 311 is formed on a certain region of the body part 310. For example, as shown in FIG. 3, the mesh part 311 may be formed on both upper and lower sides of the body part 310. Alternatively, it may be formed on either upper or lower side of the body part 310, or may be formed on the entire circumferential surface of the body part 310. The mesh part 311 allows the second fluid (a wet fluid) introduced through the second fluid inlet 131, a description of which will follow, to be introduced into the assembly type cartridge block 300 such that, in the assembly type cartridge block 300, the second fluid can exchange the moisture with the first fluid (a dry fluid) introduced through the first fluid inlet 121. Alternatively, the second fluid may be a dry fluid and the first fluid may be a humid fluid. The mesh part 311 prevents a portion of the second fluid from directly colliding with the hollow fiber membranes disposed in the assembly type cartridge block 300 such that any damage of the hollow fiber membranes, which otherwise might occur due to such collision, can be avoided.

The fastening part 320 is formed at any one surface of the body part 310, and enables the assembly type cartridge block to be fastened to an adjacent assembly type cartridge block. Any means capable of fastening two unit elements to each other may be used as the fastening part 320. For example, as shown in FIG. 3, a fastening protrusion 322 (see FIG. 7) may be formed on one side of the body part 310 and a fastening recess 321 may be formed on the other side of the body part, such that a fastening protrusion 322 of an adjacent assembly type cartridge block is inserted into the fastening recess 321. Alternatively, for example, a straight-line fastening protrusion may be formed on one side of the body part 310 and a straight-line fastening recess (a fastening slide) may be formed in the other side of the body part, such that an adjacent assembly type cartridge block can be coupled to the assembly type cartridge block 300 in a sliding fashion.

The body part 310 may be provided at opposite ends thereof with potting parts (not shown) configured to bind the hollow fiber membranes together and to fill gaps between the hollow fiber membranes. Alternatively, instead of forming the potting parts for the assembly type cartridge blocks 300 individually, it is also possible to collectively form a potting part at each of the opposite ends of a cartridge 210 or cartridge unit 200 having the plurality of assembly type cartridge blocks 300 fastened to each other. Further, it is also possible to form the potting parts at the opposite ends of the body parts 310 of each assembly type cartridge block 300 and collectively form additional potting parts at the opposite ends of a cartridge 210 or cartridge unit 200 having the plurality of assembly type cartridge blocks 300 fastened to each other.

Figure 7:
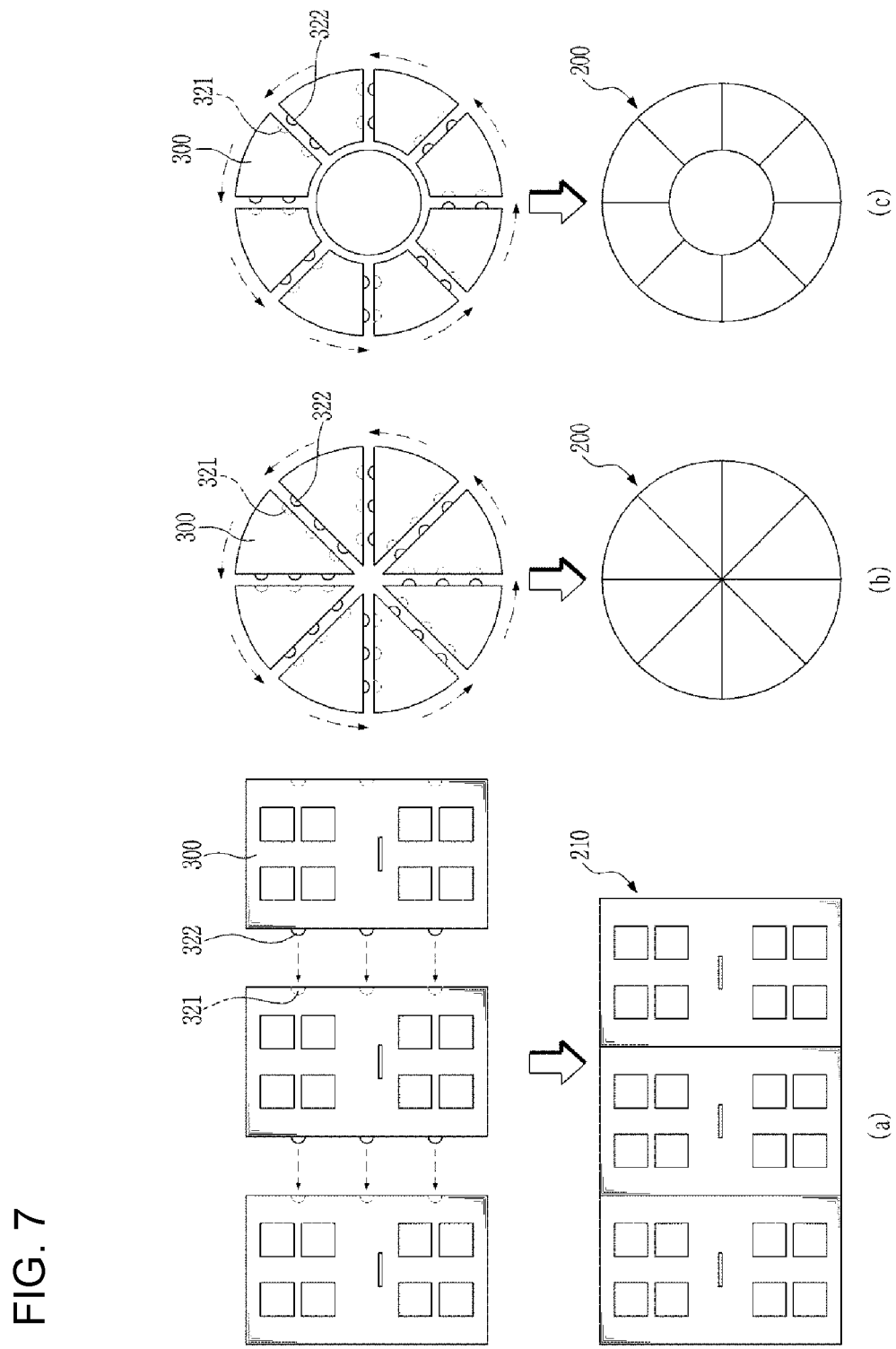
FIG. 7 is a view showing a process of manufacturing the hollow fiber membrane module according to the first embodiment of the present disclosure.

After a plurality of hollow fiber membranes are inserted into each assembly type cartridge block 300 constructed as described above, adjacent assembly type cartridge blocks 300 are fastened to each other to form a single cartridge 210 or a single cartridge unit 200, as shown in FIG. 7. It is also possible to insert the plurality of hollow fiber membranes into each assembly type cartridge block 300 after the cartridge 210 or cartridge unit 200 is formed.

A hollow fiber membrane module can be obtained by inserting a plurality of cartridges 210 fastened to each other or the cartridge unit 200 into the housing unit 100 and coupling the housing caps 120 to the opposite ends of the housing unit 100, respectively.

According to the first embodiment of the present disclosure described above, it is possible to install a cartridge in the housing unit 100 using a standardized assembly type cartridge block, irrespective of the size of the housing unit 100. Consequently, it is not necessary to separately manufacture a cartridge having a size corresponding to the size of the housing unit 100. In addition, since it is possible to install the cartridge in the housing unit 100 irrespective of the size of the housing unit 100, it is possible to produce the cartridges for hollow fiber membrane modules in large quantities.

A conventional cartridge is manufactured so as to have a relatively large size, and therefore the inner space of the cartridge in which the hollow fiber membranes can move relative to each other is large. Consequently, there is a high risk of entanglement and damage of the hollow fiber membranes during the manufacturing or operating process.

On the other hand, the standardized assembly type cartridge block according to the present disclosure has a relatively small size, and therefore the space inside the assembly type cartridge block is so small that the hollow fiber membranes can be densely packed therein and can hardly move relative to each other. Consequently, the risk of entanglement and damage of the hollow fiber membranes that otherwise might occur during the manufacturing or operating process can be reduced. In addition, the hollow fiber membranes inserted into the assembly type cartridge block having a relatively small size are structurally supported by the assembly type cartridge block so that a risk of damage of the hollow fiber membranes is reduced.

Figure 8:
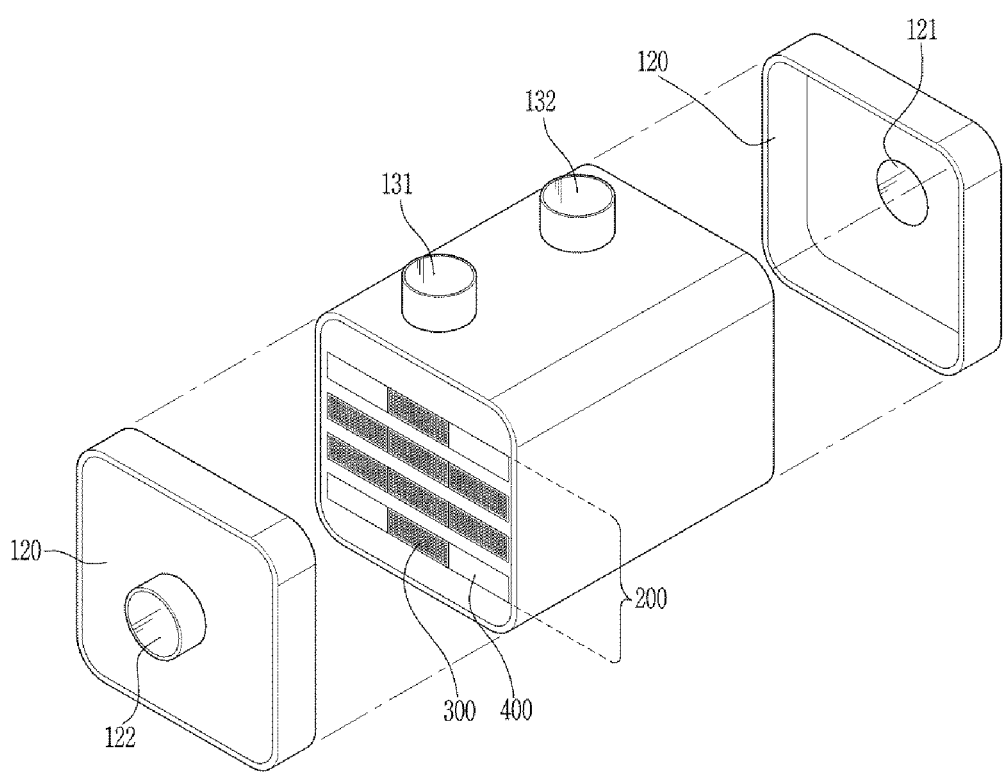
FIG. 8 shows a hollow fiber membrane module according to a second embodiment of the present disclosure.

Next, a hollow fiber membrane module according to a second embodiment of the present disclosure will be described with reference to FIG. 8. FIG. 8 shows a hollow fiber membrane module according to the second embodiment of the present disclosure.

As shown in FIG. 8, the hollow fiber membrane module according to the second embodiment of the present disclosure comprises a housing unit 100 and a cartridge unit 200. The hollow fiber membrane module according to the second embodiment is different from the hollow fiber membrane module according to the first embodiment in that the cartridge unit 200 further comprises a dummy cartridge block 400. The other components of the hollow fiber membrane module according to the second embodiment are identical to those of the hollow fiber membrane module according to the first embodiment, and therefore a detailed description thereof will be omitted.

The dummy cartridge block 400 includes a body part 310 and a fastening part 320, which are similar to those of the assembly type cartridge block 300 according to the first embodiment described above. However, no hollow fiber membranes for moisture exchange exists in the body part 310 of the dummy cartridge block 400. Instead, the body part 310 the dummy cartridge block 400 has flow membranes therein or is filled with fluid impermeable membranes, wherein the flow membranes are configured to allow a fluid to flow therethrough without moisture exchange.

Since no moisture exchange is performed in the dummy cartridge block 400, the dummy cartridge block has no influence on improvement in humidification efficiency. In the case in which the size of the housing unit 100 is greater than a size for desired humidification efficiency, however, an appropriate number of dummy cartridge blocks 400 may be inserted therein in order to achieve desired humidification efficiency.

Figure 9:
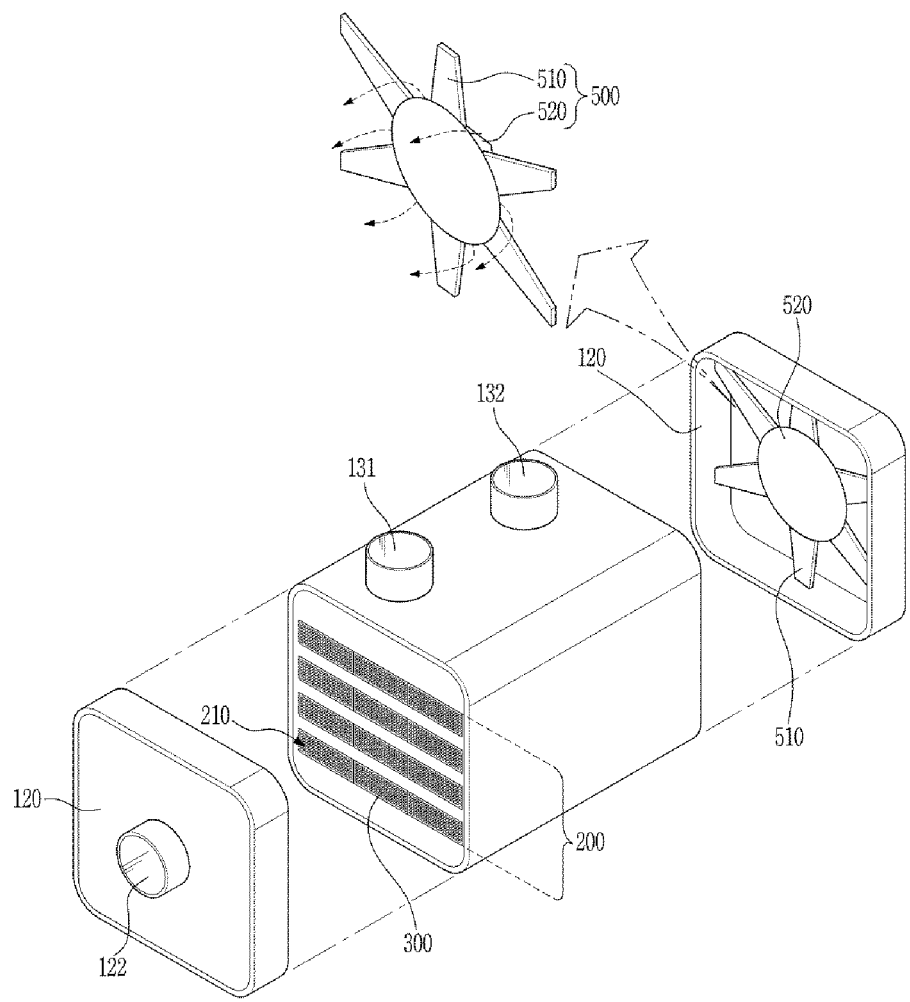
FIG. 9 is shows a hollow fiber membrane module according to a third embodiment of the present disclosure.

Next, a hollow fiber membrane module according to a third embodiment of the present disclosure will be described with reference to FIG. 9. FIG. 9 is a view showing the hollow fiber membrane module according to a third embodiment of the present disclosure.

As shown in FIG. 9, the hollow fiber membrane module according to the third embodiment of the present disclosure includes a housing unit 100 and a cartridge unit 200. The hollow fiber membrane module according to the third embodiment is different from the hollow fiber membrane module according to the first embodiment in that a fluid guide 500 is formed on the housing cap 120 having the first fluid inlet 121. The other components of the hollow fiber membrane module according to the third embodiment are identical to those of the hollow fiber membrane module according to the first embodiment, and therefore a detailed description thereof will be omitted.

The first fluid is introduced into the housing unit 100 through the first fluid inlet 121 and then supplied to the cartridge unit 200. At this time, the cartridges close to the first fluid inlet 121 can be supplied with the first fluid well. Due to the arrangement-related structural limitations of the cartridge unit 200, however, the farther the cartridges are disposed from the first fluid inlet 121, the less the first fluid can be supplied thereto.

Thus, according to this embodiment, a fluid guide 500 (510 and 520) is formed on the housing cap 120 having the first fluid inlet 121, in order to uniformly supply the first fluid to the entire region of the cartridge unit 200.

As shown in FIG. 9, the fluid guide 500 includes support bars 510 connected to the housing cap 120 and a guide plate 520 connected to the support bars 510. The guide plate 520 may be formed to have an appropriate size depending on desired humidification efficiency. In order to minimize the flow resistance generated by the guide plate 520 with respect to the first fluid, the guide plate 520 is preferably formed in the shape of a cone or a polygonal pyramid. The first fluid introduced through the first fluid inlet 121 collides with the guide plate 520, flows through spaces between the respective support bars 510 while being guided by the guide plate 520, and enters the cartridge unit 200.

Figure 10:
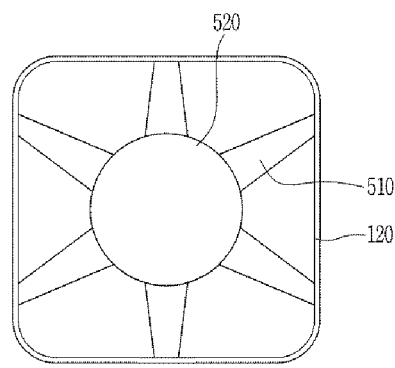
FIG. 10 shows a fluid guide of the hollow fiber membrane module according to the third embodiment of the present disclosure.

As shown in FIG. 10, each of the support bars 510 may be formed so as to extend from the outer circumferential surface of the guide plate 520. In this case, each of the support bars 510 is preferably formed in such a way that the width thereof gradually decreases with increasing distance from the outer circumferential surface of the guide plate 520. As a result, the flow resistance to the introduced first fluid gradually decreases with increasing distance from the first fluid inlet 121, whereby it is possible to uniformly supply the first fluid over the entire region of the cartridge unit 200.

Although embodiments of the present disclosure have been described above, it will be apparent from a person having ordinary skill in the art to which the present disclosure pertains that the present disclosure can be variously modified and altered through addition, change, deletion, or supplement of components without departing from the idea of the present disclosure recited in the following claims and that such modifications and alterations fall within the scope of right of the present disclosure.

The invention claimed is:

1. A hollow fiber membrane module comprising:
    a housing unit having a first fluid inlet, a first fluid outlet, a second fluid inlet, and a second fluid outlet; and
    a plurality of cartridges disposed in the housing unit, the plurality of cartridges being spaced apart from each other,
    wherein
    each of the cartridges comprises a plurality of assembly type cartridge blocks fastened to each other,
    each of the assembly type cartridge blocks comprises:
    a body part having a plurality of hollow fiber membranes therein, the body part having a mesh part configured to allow a fluid to be introduced into the body part therethrough; and
    a fastening part formed on the body part, the assembly type cartridge blocks being fastened to each other by means of the fastening parts thereof, and
    the fastening part comprises fastening protrusion on one side of the body part and a fastening recess on the other side of the body part, such that two adjacent assembly type cartridge blocks are fastened to each other by inserting the fastening part of one of the two adjacent assembly type cartridge blocks into the fastening recess of the other thereof.

2. The hollow fiber membrane module according to claim 1, wherein the body part has a shape of a polygonal prism.

3. The hollow fiber membrane module according to claim 1, wherein the body part has a shape of a fan-shaped prism with a fan-shaped base plane or a shape of a doughnut-shaped and fan-shaped prism formed by cutting an end part of a fan-shaped prism in such a way that a base plane thereof has an arc shape in its entirety.

4. The hollow fiber membrane module according to claim 1, wherein the body part is provided at opposite ends thereof with potting parts configured to bind the hollow fiber membranes together and to fill gaps between the hollow fiber membranes.

5. The hollow fiber membrane module according to claim 1, wherein at least one of the cartridges further comprises a dummy cartridge block which has flow membranes therein or is filled with fluid impermeable membranes, the flow membranes configured to allow a fluid to flow therethrough without moisture exchange.

6. The hollow fiber membrane module according to claim 1, wherein the housing unit comprises:
    a housing cap having the first fluid inlet; and
    a fluid guide formed on the housing cap, the fluid guide configured to uniformly supply a first fluid introduced through the first fluid inlet to the cartridge unit.

\* \* \* \* \*